United States Patent [19]

Ishii

[11] 3,750,270

[45] Aug. 7, 1973

[54] SEMICONDUCTOR STRAIN SENSITIVE ELEMENT OF PREDETERMINED TEMPERATURE COEFFICIENT OF RESISTANCE AND METHOD OF MAKING SAME

[75] Inventor: Katsuyuki Ishii, Nagoya, Japan

[73] Assignee: Kabushiki Kaisha Toyota Chuo Kenkyusho, Nagoya-shi, Japan

[22] Filed: Aug. 4, 1970

[21] Appl. No.: 60,830

[30] Foreign Application Priority Data

Aug. 7, 1969 Japan ............ 44/62575

[52] U.S. Cl. ............ 29/580, 29/610 SG, 148/185, 148/187

[51] Int. Cl. ............ B01j 17/00

[58] Field of Search ............ 29/580, 583, 576, 29/610 SG; 148/185, 187

[56] References Cited

UNITED STATES PATENTS

| | | | |
|---|---|---|---|
| 2,947,924 | 8/1960 | Pardue | 29/580 |
| 3,406,050 | 10/1968 | Shortes | 29/580 |
| 3,490,140 | 1/1970 | Knight et al. | 29/576 |

*Primary Examiner*—Charles W. Lanham
*Assistant Examiner*—W. Tupman
*Attorney*—Berman, Davidson and Berman

[57] ABSTRACT

A semiconductor strain sensitive element made by doping impurities into a semiconductor crystal wafer, or strip, to form plural regions of the same conductive type, but different temperature coefficients of resistance, and varying the proportionate volumes of said regions by polishing, or etching, to obtain an element having a predetermined temperature coefficient of resistance.

2 Claims, 13 Drawing Figures

INVENTOR
KATSUYUKI ISHII,

BY Berman, Davidson & Berman,
ATTORNEYS

INVENTOR
KATSUYUKI ISHII,

BY Berman, Davidson & Berman,
ATTORNEYS.

INVENTOR

KATSUYUKI ISHII,

BY Berman, Davidson & Berman, ATTORNEYS.

SEMICONDUCTOR STRAIN SENSITIVE ELEMENT OF PREDETERMINED TEMPERATURE COEFFICIENT OF RESISTANCE AND METHOD OF MAKING SAME

BACKGROUND OF THE INVENTION

The present invention relates to a semiconductor strain sensitive element having a predetermined temperature coefficient of resistance and to a method of producing the same.

It is an essential requirement of semiconductor strain gauges (hereinafter called "strain gauges") that their physical characteristics vary little with temperature, at least in the range of temperature normally encountered during actual use and operation. It is particularly important that their resistance variations with temperature be small in order to prevent serious errors of measurement.

Heretofore, in order to compensate the error caused by change of resistance with temperature, electric circuits have been used embodying plural strain gauges of equal temperature coefficients of resistance and so positioned that the measurement error of one gauge cancels the error of the other. But it has been difficult to make, or select strain gauges having equal, or equal and opposite temperature coefficients of resistance, and it has been inconvenient to actually use them, when found.

Many studies have been conducted and many attempts have been made to fabricate easily strain gauges having small and preselected coefficients of resistance, without successful results.

The conventional method of producing strain sensitive gauges includes forming semiconductor crystals by the pulling method, or the like, slicing wafers from the crystals, cutting the wafers so as to obtain thin strip elements of desired size for the strain gauges, and connecting leads to the elements. The temperature coefficient of resistance of a semiconductor principally depends upon the crystal condition of the semiconductor, and upon the kind and density of impurities doped into said semiconductor. Therefore, the principal characteristics of conventional gauges are determined during the step of producing the properly doped crystal and, therefore, it has been very difficult to try to adjust the temperature coefficient of resistance by subsequent treatment steps. A very high level technique is necessary to control accurately both the crystal condition of the semiconductor and the density of the impurities. Therefore, it has been very difficult to obtain strain gauges, by the conventional method, which are accurate and have a desired temperature coefficient of resistance even when exercising the most advanced techniques and a great deal of care and attention.

SUMMARY OF THE INVENTION

According to the present invention, impurities are partially doped into a semiconductor crystal after it is formed and sliced into a wafer. The wafer, or a thin strip cut therefrom as a base, is so doped as to provide plural regions of a single conductive type (P-type or N-type) and of different coefficients of resistance. A strain gauge of desired temperature coefficient of resistance can thus be accurately produced with ease by adjusting the relative volumes of the said plural regions as, for example, by polishing, or etching off portions of the surface areas of the regions. In this way, the various defects, difficulties, and disadvantages of the conventional method of making a strain gauge are overcome.

To form the plural regions of P-conductive type into a wafer base of N-conductive type, and contrarily to form the plural regions of N-conductive type into a wafer of P-conductive type, are both outside of the present invention. Therefore, the obtained thin element for use as a strain gauge is wholly of a single conductive type and includes plural regions of different temperature coefficients of resistance.

It will be apparent from the above that the primary object of the present invention is to provide a semiconductor strain sensitive element having a predetermined temperature coefficient of resistance and a method of producing the same.

Another object of the present invention is to provide a method of producing a semiconductor strain sensitive element including plural regions of the same conductive type and of different temperature coefficients of resistance by doping impurities into a semiconductor crystal wafer, and adjusting the proportionate volume of said regions to obtain an element having a predetermined temperature coefficient of resistance.

A further object of the invention is to provide a method of producing a semiconductor strain sensitive element having a plurality of doped regions and eliminating a portion of at least one of said regions by polishing, or etching to vary the proportionate region volumes and thereby achieve a preselected temperature coefficient of resistance with ease and accuracy.

A still further object of the invention is to provide a method for making a semiconductor strain sensitive element which is highly sensitive and has a large output voltage and which is subject to small measurement error due to temperature variation.

Still another object of the invention is to provide a method for producing a semiconductor strain sensitive element having a small temperature coefficient of resistance, high resistivity and little sensitivity variation with temperature.

Yet a further object of the invention is to provide a semiconductor strain sensitive element having a positive, zero, or negative temperature coefficient of resistance, high resistivity, and little variation in temperature within an applied temperature range.

BRIEF DESCRIPTION OF THE DRAWINGS

The novel features that are considered characteristic of the invention are set forth with particularity in the appended claims. The invention, itself, however, both as to its organization and its method of operation, together with additional objects and advantages thereof, will best be understood from the following description of specific embodiments when read in connection with the accompanying drawings, wherein like reference characters indicate like parts throughout the several Figures, and in which:

FIGS. 1 to 4 illustrate a first embodiment of the invention by sectional diagrams indicating the sequential steps of production of a strain sensitive element, in which: FIG. 1 is a sectional view of a semiconductor crystal wafer; FIG. 2 is a similar view of the wafer including a diffusion layer; FIG. 3 is a similar view of a double-layered wafer; and FIG. 4 is a sectional view of a complete strain gauge;

FIGS. 5 and 6 illustrate a second embodiment of the inventive method, in which: FIG. 5 is a sectional view of a wafer evaporated with Au after reaching the stage shown in FIG. 2 of treatment as in the first embodiment; FIG. 6 shows the FIG. 5 wafer doped with Au;

DESCRIPTION OF PREFERRED EMBODIMENTS

Figure 1:
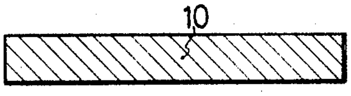

Embodiment I: In this embodiment of the inventive method, illustrated in FIGS. 1 – 4, two regions are formed in a semiconductor crystal wafer base by doping boron (B) as an impurity into the surface of the wafer which is sliced from a P-type silicon (Si) semiconductor single crystal, and strain gauges of different temperature coefficients of resistance are obtained by varying the proportionate volumes, or share ratio, of the said two regions. Initially, a P-type (Si) crystal wafer base, wholly doped with boron, whose resistivity is 0.46 Ω-cm at a temperature of 20° C, is shaped into a disc of 25mm diameter and 0.42mm thickness by polishing with SiC powder of 3 microns diameter, and then the disc is etched to reduce the thickness to 0.35mm so as to eliminate the damaged surface layer thereof. After cutting off the edge of said disc, a base wafer 10 of rectangular form in section is obtained, as shown in FIG. 1.

Figure 2:
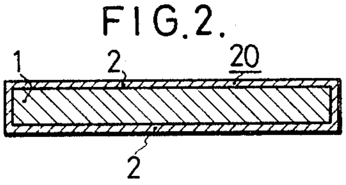
Figure 3:
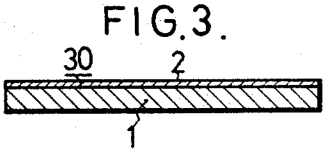

The wafer 10 is next disposed in a geaseous mixture of nitrogen and oxygen passed through and over $B_2O_3$ which is retained at a temperature of 1,200° C and the wafer is held at 1,200° C for 120 minutes, thereby obtaining a layered wafer 20 with a boron diffusion layer 2 on the whole surface thereof without changing the general shape of base wafer 10, as shown in FIG. 2. The central region 1 of wafer 20, inside layer 2, retains the same boron doped composition as that of the base wafer 10. The boron density of the diffusion layer 2 is about $1\times10^{19}/cm^3$ and the depth of layer 2 is about 6μ. Next, as shown in FIG. 3, the wafer 30 having the boron diffusion layer 2 only on its upper surface is obtained by polishing in the same manner as above to eliminate the layer 2 on the lower surface and all the side surfaces of the wafer 20. Then, the lower surface of the region 1 is etched so as to vary the proportionate volumes (share ratio) of the region 1 to the region 2.

During the steps of polishing and etching mentioned above, wax is painted on those surfaces which do not require treatment so as to prevent such surfaces from breaking and etching.

Figure 4:
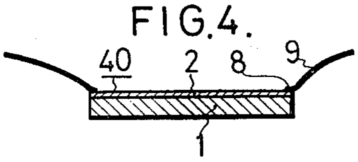

The strain gauge 40, as shown in FIG. 4, is obtained by cutting the wafer 30 to form an element, or strip, 5mm in length and 0.4mm in width, by eliminating the oxide film on its surface by etching, as described above, and by then connecting leads with ohmic contacts to both ends. As the crystal direction connecting the electrodes of the strain gauge, the <111> direction is chosen.

The resulting strain gauge 40 is constituted as a thin strip including the region 1, whose composition is the same as that of the base wafer 10, and the region 2 is formed by the boron diffusion layer, ohmic metal electrodes 8 formed by evaporating aluminum on the upper surface of the strip at both ends, and Au leads 9 each having one end connected ohmically to an electrode 8.

Five different strain gauges 40, as the samples A, B, C, D and E, in Table 1 below, were made using five wafers wherein the proportionate volumes of the region 1 to the region 2 differed on the different wafers, and the resistance variation with temperature and sensitivity variation with temperature were measured. The results are explained later. Table 1 shows the thicknesses of each sample and the thicknesses of the layers, or regions 1 and 2 together with the measured resistance and sensitivity of each sample:

TABLE 1

| Samples | Thickness: Entire strain gauge (mm.) | Thickness: Region 1 (mm.) | Thickness: Region 2 (mm.) | Resistance, Ω (0° C.) | Sensitivity (0° C.) | Note |
|---|---|---|---|---|---|---|
| A | 0.20 | 0.194 | 0.006 | 149 | 165 | |
| B | 0.10 | 0.094 | 0.006 | 224 | 155 | |
| C | 0.05 | 0.044 | 0.006 | 300 | 145 | |
| D | 0.044 | 0.044 | None | 889 | 185 | Crystal wafer portion. |
| E | 0.006 | None | 0.006 | 453 | 125 | Portion of boron diffusion layer. |

In the above table, the sample D had the same composition as that of the base crystal wafer 1, or 10. The sample E had only a boron diffusion layer 2. The former sample was obtained from the wafer 30 by eliminating the region 2, and the latter sample was obtained by eliminating the region 1 by polishing and etching. In Table 1 the values of resistance and sensitivity at 0° C are shown, and sensitivity (K) indicates resistance variation caused by the applied strain defined by the following formula:

$$K = (R_\epsilon - R_0) / \epsilon \cdot R_0$$

(where, ε: strain applied to strain gauge, $R_0$ and $R_\epsilon$ : resistance of strain gauge when no strain and strain ε are applied, respectively).

The resistances of the respective samples above were measured at temperatures ranging from 0° to 100° C by intervals of 5° C, and the resistance variations of the respective samples were calculated according to the formula $P/P_0$ (where $P_0$ : resistance at 0° C, $P$ : resistance at respective temperatures). The results are shown in FIG. 10 as characteristic curves $A_1$, $B_1$, $C_1$, $D_1$ and $E_1$ for the samples A, B, C, D and E, respectively, where the abscissa indicates temperature (°C) and the ordinate indicates the resistance variation ($P/P_0$).

Figure 10:
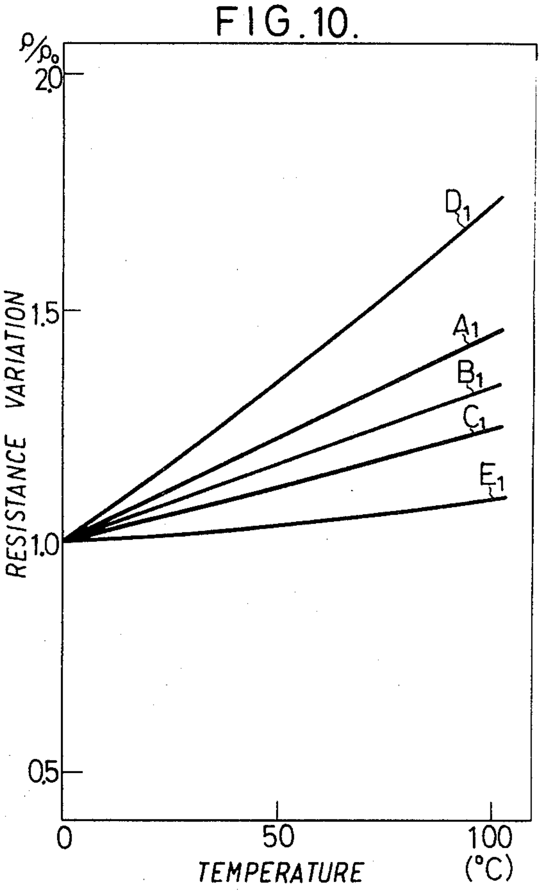
FIG. 10 is a graph showing the relation between temperature and resistance variation for strain gauges made as in the first embodiment.

It is apparent from FIG. 10 that the resistance variation with temperature depends on the share ratio ( the ratio of the thickness of layers 1 and 2). When layer 2 is much thinner than layer 1, the variation of resistance is large, and said variation becomes smaller as the thickness of layer 2 is proportionately increased with respect to the thickness of layer 1. The values of the resistance variation with temperature of the samples A, B, and C which include both the region 1 and the region 2, fall between the values of the variation resistance with temperature of the sample D which includes only the region 1 and that of the sample E which includes only the region 2.

The sensitivities of the respective samples A – E were measured and calculated at temperatures ranging from 0° to 100° C by intervals of 5° C, and the sensitivity variation calculated according to the formula, $K/K_0$ (where $K_0$: sensitivity at 0° C, $K$: sensitivity a respective temperatures). The results are shown in FIG. 11 as characteristic curves $A_2$, $B_2$, $C_2$, $D_2$ and $E_2$ for the samples A, B, C, D and E, respectively, where the abscissa indicates temperature (°C) and the ordinate indicates the sensitivity variation ($K/K_0$).

Figure 11:
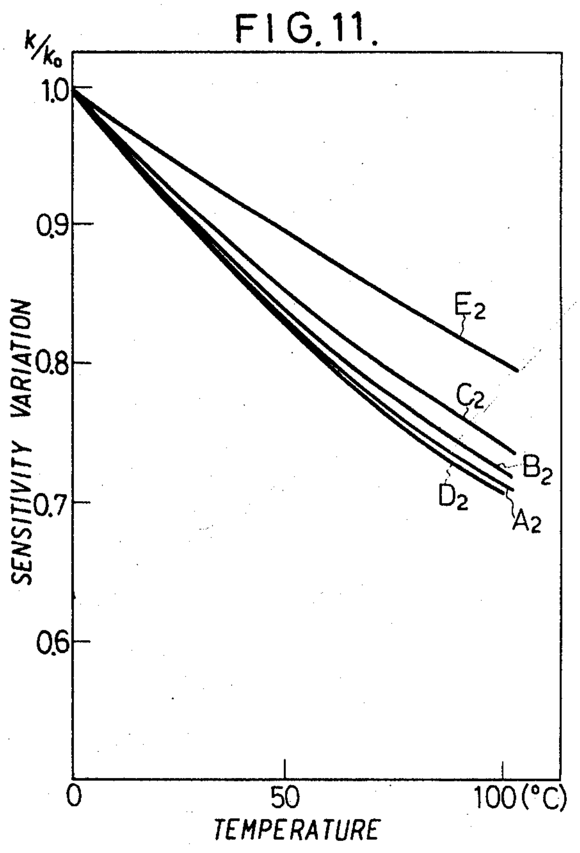
FIG. 11 is a graph showing the relation between temperature and strain sensitivity variation for strain gauges as made in the first embodiment.

It is apparent from FIG. 11 that the sensitivity variation with temperature shows a similar tendency to that of the resistance variation with temperature. The sensitivity variation tends to be smaller as the proportionate thickness, or volume, (share ratio) of the region 2 becomes larger, and thus the sensitivity variation values of the samples A, B and C fall between the variation values of the samples D and E.

From the above it is clear that by partly doping impurities into a semiconductor crystal wafer base to form plural regions of a single conductor type, the regions having different temperature coefficients of resistance, a wafer having a different temperature coefficient of resistance than that of the said base can be obtained, whereby a strain gauge of desired, or nearly desired value of temperature coefficient can be made.

Moreover, by varying the share ratio of the regions through elimination of part, or most of at least one of said regions, the temperature coefficient of resistance can be freely varied and, therefore, a strain gauge of the desired value of the temperature coefficient can be made with ease and with accuracy. In the same way, the sensitivity variation with temperature of the strain gauge can be made small.

Figure 5:
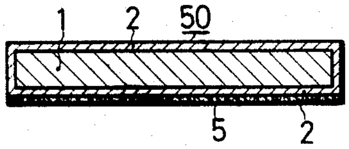
Figure 6:
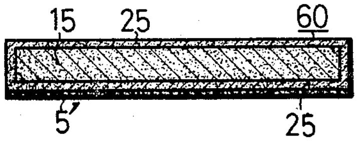

EMBODIMENT 2: The second embodiment employs a method which includes the initial steps of the first embodiment noted above. A layered wafer 20 (see FIG. 2) having a boron diffusion layer 2 on the whole surface is made as in the first embodiment, using a P-type silicon crystal wafer doped with boron ( see FIG. 1), Then, as shown in FIG. 5, wafer 50, having boron diffusion layer 2 on the upper and side surfaces and having both an Au evaporated film 5 and a boron diffusion layer 2 on the lower surface thereof, is formed by first eliminating the oxide film of the boron diffusion layer 2 on the lower surface of the wafer 20 with HF, and by then evaporating Au onto the lower surface to the thickness of 600A° under a vacuum of $1.5\times10^{-5}$mmHg and at a temperature of 250° C. Wafer 50 is heated in a gaseous mixture of nitrogen and oxygen for 60 minutes at 1,200° C so as to dope Au into the whole body of the wafer, and as shown in FIG. 6, an Au doped layer wafer 60 is obtained having Au doped region 15 in the center thereof, the region 25 wherein Au is doped into a boron diffusion layer, and the remaining Au evaporated film surface 5'. The diffusion coefficient of Au in the silicon crystal is about $3.5\times10^{-7}$ cm²/ per second at 1,200° C, so in this embodiment Au is doped almost uniformly into the silicon crystal wafer of 0.35mm thickness. In the boron diffusion layer 25, the boron density is $4\times10^{18}$/cm³, the layer depth is about 6$\mu$, and the Au density is about $4.5\times10^{16}$/cm³.

Next, a wafer, doped with Au as above, and having a region 25 of boron diffusion only on its upper surface, is obtained by polishing as in the first embodiment, to eliminate the remaining Au evaporated film surface 5' on the lower surface of the wafer 60 and the boron diffusion layer 25 on the lower and side surfaces of the wafer 60. The resultant wafer is reduced to a desired thickness by eliminating part of the lower portion of region 15 by etching so as to vary the share ratio of the region 15 to the region 25.

Using five different wafers having different share ratios of the region 15 to the region 25, strain gauges were made by cutting the wafers to 5mm length and 0.4mm width in the same way as in the first embodiment. As a crystal direction connecting the electrodes of the strain gauges, the <111> was chosen. The obtained strain gauges were labeled as samples F, G, H, I and J and the resistance variation with temperature and the sensitivity variation with temperature were measured as in the first embodiment.

Table 2 below shows the thickness of each sample F – J, the thickness of its region 15, and its region 25, as well as the resistance and sensitivity of each sample at 0° C:

TABLE 2

| | Thickness | | | | | |
|---|---|---|---|---|---|---|
| Samples | Entire strain gauge (mm.) | Region 15 (mm.) | Region 25 (mm.) | Resistance, Ω (0° C.) | Sensitivity (0° C.) | Note |
| F | 0.20 | 0.194 | 0.006 | 658 | 144 | |
| G | 0.10 | 0.094 | 0.006 | 760 | 143 | |
| H | 0.05 | 0.044 | 0.006 | 824 | 143 | |
| I | 0.044 | 0.044 | None | 9,551 | 151 | Portion of Au doped crystal. |
| J | 0.006 | None | 0.006 | 902 | 142 | Portion of Au doped boron diffusion layer. |

In Table 2, sample I corresponds to a single region 15 only, formed of P-type silicon crystal wafer doped with Au, and the sample J corresponds to a boron diffusion layer 25 only, doped with Au. The former sample was obtained from the wafer by eliminating the region 25, and the latter sample was obtained by eliminating the region 15, by polishing and etching.

Figures 12, 13:
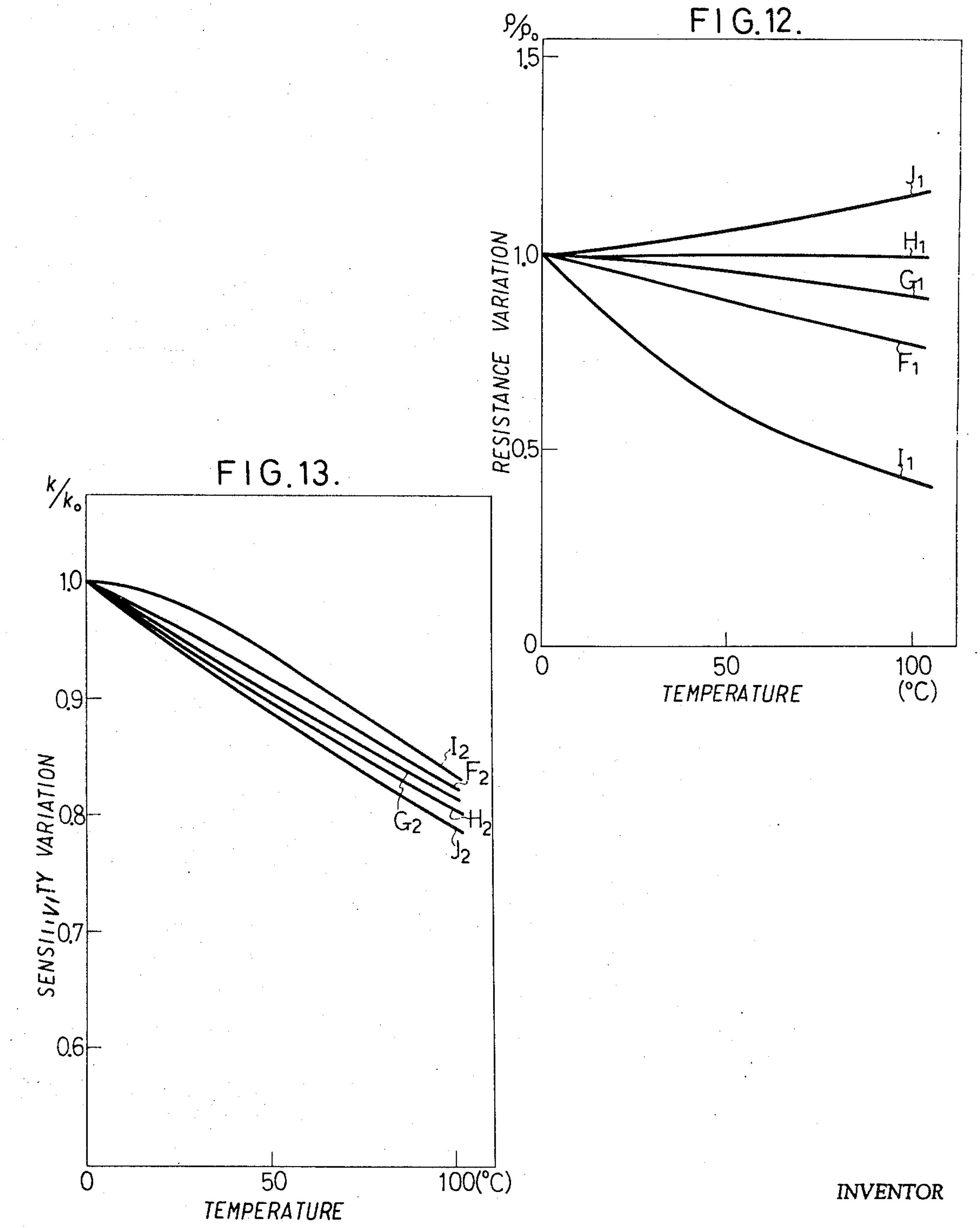
FIG. 12 is a graph showing the relation between temperature and resistance variation for strain gauges made according to the second embodiment of the inventive method.
FIG. 13 is a graph showing the relation between temperature and strain sensitivity variation for strain gauges made according to the second inventive method embodiment.

The resistance variation with temperature of each sample was measured and calculated as in the first embodiment, and the results are shown in FIG. 12 as characteristic curves $F_1$, $G_1$, $H_1$, $I_1$ and $J_1$ for the samples F, G, H, I and J, respectively, where the abscissa indicates temperature (°C) and the ordinate indicates resistance variation ($P/P_0$).

It is apparent from FIG. 12 that the temperature coefficients of resistance (slopes of curves $F_1$, $G_1$, $H_1$ ) of the samples F, G and H, each having both said regions 15 and 25, tend to be negative from zero as the proportionate thickness of the layer 15 to the layer 25 (share ratio) becomes larger. The temperature coefficient of resistance in the sample J, having only the region 25, is positive, while that of the sample I, having only the region 15, is negative, and the said coefficients of the samples F, G and H having both regions lie between the coefficient of the sample J and the coefficient of the sample I.

The sensitivity variation with temperature of each sample was also measured and calculated as in the first embodiment, and the results are shown in FIG. 13 as characteristic curves $F_2$, $G_2$, $H_2$, $I_2$ and $J_2$ for the samples F, G, H, I and J, respectively, where the abscissa indicates temperature (°C) and the ordinate indicates sensitivity variation ($K/K_o$).

It is apparent from FIG. 13 that the sensitivity variations with temperature show the same tendency as the resistance variation with temperature for the same sample, and the sensitivity variation tends to be smaller as the share ratio of the region 15 to the region 25 becomes larger, sample F and its curve $F_2$ showing less change in sensitivity than sample H and its curve $H_2$. The sensitivity variations for samples F, G and H fall between the corresponding variations for samples I and J.

From the above it will be clear that in the second embodiment, a strain gauge of the desired temperature coefficient of resistance can be obtained as in the first embodiment, and fursther, both positive and negative regions are formed so that the resultant coefficient can be zero, or negative. As previously explained, the two regions are formed by utilizing boron as a first impurity doped into the surface of a semiconductor crystal wafer as a base, the wafer having been sliced from a P-type semiconductor single crystal as in embodiment 1, and thereafter Au is doped as a second impurity into the whole body of the wafer, thereby obtaining two regions of a single conductive type and of different temperature coefficients of resistance, positive and negative. Thus, by varying the share ratio of the said two regions, strain gauges of desired coefficient such as positive, negative, and zero can be obtained with ease and accuracy. The above-described sample H and curve $H_1$ in FIG. 12 shows a temperature coefficient of resistance which is nearly equal to zero in the temperature range between 0° and 100° C, and this characteristic makes it very practicable and suitable for use as a strain gauge. In addition, the sensitivity variation with temperature can be made small in the second embodiment.

DISCUSSION OF THEORY INVOLVED IN THE PREFERRED EMBODIMENTS

From the above it will be noted that a semiconductor crystal wafer, having regions of different coefficients of resistance, evidences a temperature coefficient of resistance for the over-all wafer different from that of the respective regions. The theory behind this phenomenon will be explained as follows, first referring to the strain gauge 40 shown in FIG. 4 as being comprised of regions 1 and 2. The first order of approximation of the resistances of the respective regions can be represented as follows:

The resistance of $R_1$ of the region 1 is: $R_1 = R_{10}(1 + \alpha_1 t + K_1\epsilon)$ eq. 1—1 the resistance of $R_2$ of the region 2 is:

$$R_2 = R_{20}(1 + \alpha_2 t + K_2\epsilon) \qquad \text{eq. 1—2}$$

and the resultant resistance of the strain gauge 40 is:

$$R = R_0(1 + \alpha t + K\epsilon) \qquad \text{eq. 1—3}$$

where, $R_{10}$, $R_{20}$ and $R_0$ are the resistance values of the region 1, the region 2 and the whole piece, respectively, under the conditions of standard temperature and of no strain applied; $\alpha_1$, $\alpha_2$ and $\alpha$ are the resistance-temperature coefficients of the region 1, the region 2 and the whole piece, respectively: $K_1$, $K_2$ and $K$ are the sensitivity values of the region 1, the region 2 and the whole piece, respectively; t is the difference between the measurement temperature and that of the standard; and $\epsilon$ is the strain.

And in this example, the resultant resistance R is approximately equal to the resistance of the two regions as if connected in parallel, or $$1/R_o = 1/R_{10} + 1/R_{20} \qquad \text{eq. 2-1}$$

and since the temperature coefficients of resistance and strain sensitivity are directly dependent on resistance, the following similar equations apply:

$$\alpha/R_o = \alpha_1/R_{10} + \alpha_2/R_{20} \qquad \text{eq. 2—2}$$

$$K/R_o = K_1/R_{10} + K_2/R_{20} \qquad \text{eq. 2—3}$$

Considering eq. 2—2 when $R_{10}$ is very small the term $\alpha_1/R_{10}$ approaches $\alpha_1$ and when $R_{20}$ becomes very large the term $\alpha_2/R_{20}$ approcahes zero. Conversely, when $R_{10}$ becomes very large and $R_{20}$ very small $\alpha_1/R_{10}$ approaches zero and $\alpha_2/R_{20}$ approaches $\alpha_2$. Thus, the temperature coefficient of resistance $\alpha$ tends tohave a value between the coefficients $\alpha_1$ and $\alpha_2$, and the coefficient $\alpha$ can be varied at will by changing the ratio between the resistance $R_{10}$ and $R_{20}$ (that is, the share ratio of two regions).

The temperature coefficient of resistance of the semiconductor is, if the same atom is used as an impurity, primarily dependent upon the density of the impurity. As in the first embodiment, when the surface of a semiconductor crystal wafer homogeneously doped with an impurity to a shallow level, is further doped with the same impurity, a region of different impurity density, that is, a region having a different temperature coefficient of resistance from that of the undoped wafer is obtained. As apparent from the eq. 2—2, the said coefficient $\alpha$ can be varied by varying the share ratio between the said two regions (that is, by means of changing the ratio between the resistance values $R_{10}$ and $R_{20}$), and thus a strain auge of a desired temperature coefficient of resistance can be obtained.

When one of the said coefficients $\alpha_1$ and $\alpha_2$ is positive, and the other negative, the resultant coefficient $\alpha$ can be made negative, or zero as well as positive, by adjusting the ratio between the said resistance values $R_{10}$ and $R_{20}$.

The electron energy distribution in a semiconductor crystal may be varied by doping impurities into the crystal, and as a result, the density of the carriers tends to increase as the temperature rises. On the other hand, because the mobility of the carriers decreases as the temperature rises, the temperature coefficient of resistance of the semiconductor crystal becomes negative by doping impurities to a deep level in such manner that the increasing rate of the density of the carriers becomes larger than the decreasing rate of the mobility of the carriers with the rise of temperature. And, therefor, by varying the characteristics as described above, both a region of positive temperature coefficient of resistance and a region of negative coefficient can be formed in one semiconductor crystal wafer. In this case, because diffusion coefficients of deep level impurities in a semiconductor crystal are generally much larger than those of shallow level impurities, they diffuse into the whole space of the crystal wafer in a short period of time, and it is difficult to form a diffusion layer in a defined part of the crystal wafer.

It is, however, not difficult for form two regions, one of which has a positive temperature coefficient of resistance and the other a negative coefficient in one semiconductor crystal wafer. For example, this is easily done by adjusting the density rate between the densities of a shallw level impurity (boron, forming the diffusion layer) and a deep level impurity (Au) as in the second embodiment described above.

Taking the second embodiment as an example, the region of the semiconductor which was doped with boron as a shallow level impurity has a positive temperature coefficient of resistance, and also, according to experimental data, when the density of Au as a deep level impurity is doped in said region to a density lower than about 10 percent of the density of the carriers (nearly equal to the density of the boron) before the gold is doped, the temperature coefficient of resistance of said region is changed from that of the region before Au is doped, but said coefficient does not become negative. On the other hand, the density of Au as a deep level impurity doped higher than about 50% of the density of the carriers before Au is doped, causes the temperature coefficient of resistance to become negative. And, therefore, according to experimental data, the diffusion layer region with a positive coefficient (the said density of carriers ($y$) is: $Y_2 = 4\times10^{18}/cm3$) is formed by doping boron into the surface of the crystal wafer (the original density of carriers before doping with boron being: $Y_1 = 5\times10^{16}cm^3$), and next, so as to keep positive the said coefficient in the diffusion layer, the density of Au to be doped into this layer in made lower than 10 percent of said density $Y_2$, and in order to make the said coefficient in the region outside the diffusion layer negative, the density of Au to be doped into this region is adjusted to be more than 50 percent of the said density $Y_1$.

In order to satisfy the required density of Au, the density of Au ($X$) may be selected between $4\times10^{18}\times0.1$ and $5\times10^{16}\times0.5$, so it is easy to dope within the permissible range of about 16 in this way.

In the second embodiment, the precentage density ($X$) of Au $= (X/Y) \times 100$ ($Y$ being the carrier density). The density ($X$) of Au is about $4.5\times10^{16}$, and, therefore, in the said boron diffusion layer $(X/Y_2) \times 100$ is about $(4.5\times10^{16}\times100)/(4\times10^{18})$ or 1.1 percent, the said coefficient in this region being positive, while in the region outside the diffusion layer, $(X/Y_1) \times 100$ is about $(4.5\times10^{16}\times100)/(5\times10^{16})$ or about 90 percent, said coefficient therein being negative.

For convenience of explanation, in the two embodiments detailed above, the strain gauges have been described as being formed of silicon semiconductor crystal with boron (B) and Au as the impurities, but the crystal wafer and the impurities are not limited to those described, and the material shown in Table 3 below, for example, may be employed:

TABLE 3

| | Semiconductor crystal wafer | | | | | |
|---|---|---|---|---|---|---|
| | Si | | Ge | | GaAs | |
| Conductive type | P-type | N-type | P-type | N-type | P-type | N-type |
| Impurities (shallow level) | B, Ga | P, As | B, Ga | P, As | Zn | Sn, Te |
| Impurities (deep level) | | | Au, Cu, Fe | | | Cu, Fe |

It is generally difficult to obtain a strain gauge with a zero, or negative temperature coefficient of resistance using shallow level impurities, but the use of deep level impurities of Table 3 enable the obtainment of zero, or negative coefficient much more easily.

The formation of regions of a single conductive type and of different temperature coefficients of resistance can be obtained with any combination of crystal and impurities shown in Table 3, and the densities, or the kinds of the impurities of the respective regions may be varied in the manner as set forth above for the two described embodiments.

Figure 7:
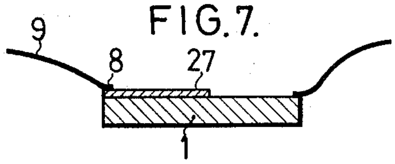
FIGS. 7 to 9 are sections of strain gauges showing various modifications of the completed gauges.
Figure 8:
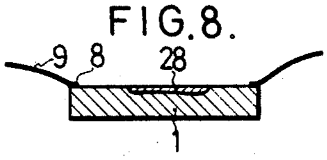
Figure 9:
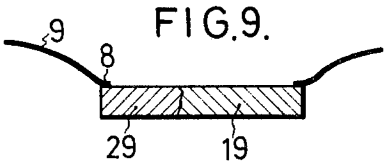

It is here noted that the positions of the two regions and their shapes in the crystal wafer are not limited to superposed double layers as described in the two embodiments above, but is is possible to obtain a strain gauge having a diffusion layer 27 at the left side of the upper surface, as shown in FIG. 7, by etching away the right side of the upper surface of the wafer shown in FIG. 3. It is also possible to obtain a strain gauge having a diffusion region 28 shown in FIG. 8, on the central part of the upper surface of the wafer by utilizing the conventional selective masking diffusion method. It is further possible to obtain a strain gauge having a diffusion region 29, as shown in FIG. 9, at the left end thereof by diffusing selectively onto the left end of the wafer. While it is most preferable to form two regions only from the viewpoint of varying the share ratio thereof, it is also possible to form three, or more regions in one wafer.

Referring again to FIG. 9, it is pointed out that it is relatively easy to form region 29 by doping with a deep level impurity from the left end and terminating the doped region near the center because of the relatively large length of the wafer. Another deep level, or a shallow level impurity may be doped into region 19 from either the top, or end surface and the share ratio of the two regions may be easily modified by cutting off an end portion of the region 19 before the ohmic lead is connected.

In order to vary the share ratio of the respective regions, polishing and etching are employed as described in the two embodiments, and this treatment may be performed before, or after obtaining the thin strip forming the strain gauge.

The present invention primarily relates to a semiconductor stran gauge and, therefore, it is generally desired that the absolute value of the temperature coefficient of resistance be small, or zero, but the present invention can be employed to produce a thermistor which requires a large absolute value of temperature coefficient of resistance.

According to the conventional production method of making a strain gauge, a semiconductor crystal is first produced and sliced to a crystal wafer, and then the wafer is cut to the appropriate size for a strain gauge, so that the temperature coefficient of resistance of the strain gauge is equal to that of the semiconductor crystal. And, therefore, to obtain strain gauges of five different coefficients, five kinds of corresponding semiconductor crystals must be produced. By the production method of the present invention, however, a single semiconductor crystal may be produced and wafers of different coefficients can be obtained by applying the inventive production method to wafers cut from the same crystal, so that many strain gauges having different coefficients can be obtained from one semiconductor crystal.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A method of producing a P-type semiconductor strain sensitive element having a temperature coefficient of resistance which is nearly equal to zero, comprising the steps of:

1. Forming a semiconductor crystal of a silicon crystal of P-type uniformly doped with boron,
2. cutting a wafer from said crystal,
3. diffusing boron into the surface of said wafer to form a boron diffusion layer,
4. diffusing gold into said wafer and boron diffusing layer to the amount that the density of gold diffused into said diffusion layer is lower than 10 percent of that of the boron in said diffusion layer and the density of gold diffused into said wafer is higher than 50 percent of that of the boron in said wafer before diffusing with boron in said third step described above so as to form said boron diffusion layer and wafer into two regions having positive and negative temperature coefficients of resistance respectively.

2. A method for producing a P-type semiconductor strain sensitive element according to claim 1, further comprising removing a portion of at least one of said regions to the amount that the resistance variations with temperature of said two regions cancel one another.

* * * * *